(12) United States Patent
Ono

(10) Patent No.: US 10,872,621 B2
(45) Date of Patent: Dec. 22, 2020

(54) PHONOGRAPH PLAYING VEHICLE

(71) Applicant: Charles Ono, El Segundo, CA (US)

(72) Inventor: Charles Ono, El Segundo, CA (US)

( * ) Notice: Subject to any disclaimer, the term of this patent is extended or adjusted under 35 U.S.C. 154(b) by 0 days.

(21) Appl. No.: 15/888,520

(22) Filed: Feb. 5, 2018

(65) Prior Publication Data

US 2019/0244633 A1 Aug. 8, 2019

(51) Int. Cl.
*G11B 19/24* (2006.01)
*G11B 3/34* (2006.01)
*G11B 19/26* (2006.01)
*G11B 19/247* (2006.01)

(52) U.S. Cl.
CPC ............... *G11B 3/34* (2013.01); *G11B 19/24* (2013.01); *G11B 19/247* (2013.01); *G11B 19/26* (2013.01)

(58) Field of Classification Search
None
See application file for complete search history.

(56) References Cited

U.S. PATENT DOCUMENTS

| | | | | |
|---|---|---|---|---|
| 3,181,870 A * | 5/1965 | Lasswell, Jr. | ............ | G11B 3/40 369/177 |
| 3,360,269 A * | 12/1967 | Dunn | ....................... | G11B 3/40 369/128 |
| 3,362,716 A * | 1/1968 | Dunn | ....................... | G11B 3/40 369/177 |
| 3,482,841 A * | 12/1969 | Erich | ....................... | G11B 3/40 369/177 |
| 3,952,170 A * | 4/1976 | Irvin | ....................... | G11B 3/40 369/134 |
| 4,166,624 A * | 9/1979 | Mori | ....................... | A63H 3/28 369/177 |
| 4,232,202 A | 11/1980 | Mori et al. | | |
| 4,284,279 A * | 8/1981 | Mori | ....................... | G11B 3/31 369/177 |
| 4,498,164 A | 2/1985 | Lebensfeld | | |
| 5,816,886 A * | 10/1998 | Cusolito | .................. | A63H 5/00 446/444 |
| 9,583,122 B2 * | 2/2017 | Pinhas | ..................... | G11B 3/46 |
| 9,672,844 B2 * | 6/2017 | Pinhas | ................. | G11B 21/043 |
| 2017/0025134 A1 * | 1/2017 | Pinhas | ..................... | G11B 3/46 |
| 2017/0125039 A1 * | 5/2017 | Pinhas | ................. | G11B 21/043 |

FOREIGN PATENT DOCUMENTS

| | | | | |
|---|---|---|---|---|
| GB | 1080102 A * | 8/1967 | ............... | G11B 3/40 |
| GB | 1145550 A * | 3/1969 | ............... | G11B 3/40 |

* cited by examiner

*Primary Examiner* — William J Klimowicz
(74) *Attorney, Agent, or Firm* — Edwin Tarver

(57) ABSTRACT

A phonograph player includes a body with a motor configured to drive a drive wheel and also having a head-shell. The head-shell rotates relative to the body and holds a needle cartridge. The head-shell is also configured to activate a sensor governing motor speed. The sensor is calibrated for rotation of the head-shell to alter motor speed, and such that rotating the head-shell results in the body portion maintaining a constant RPM relative to the phonograph. The sensor may be a light sensor, and the apparatus may include a head-shell clip for holding the head-shell. Preferably, the head-shell holds the needle cartridge in a trailing configuration, and a housing at least partially cover the body.

20 Claims, 8 Drawing Sheets

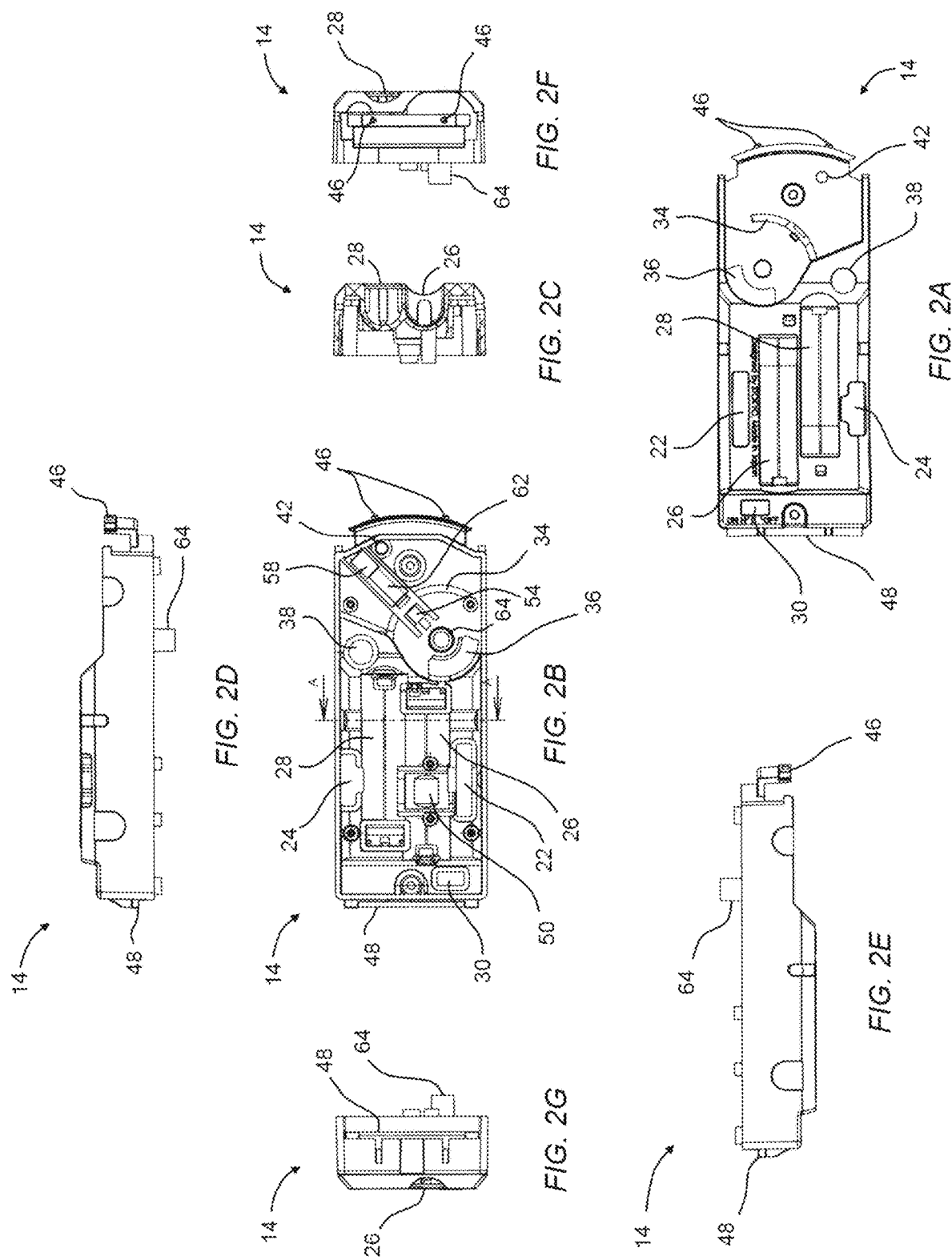

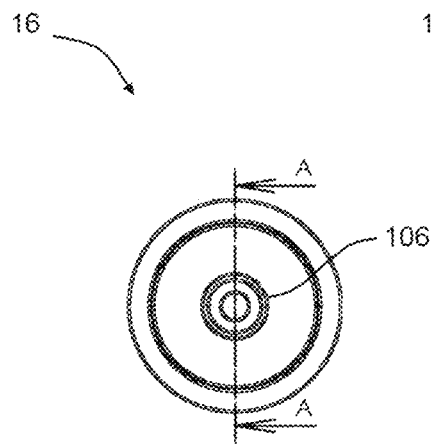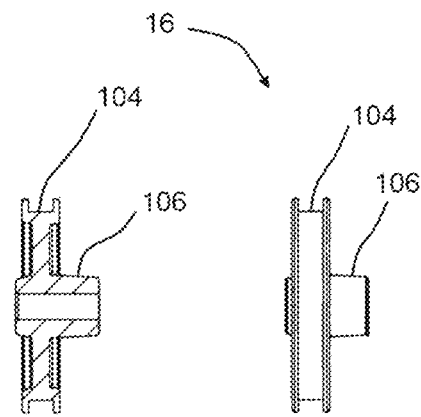
FIG. 6A  FIG. 6B  FIG. 6C
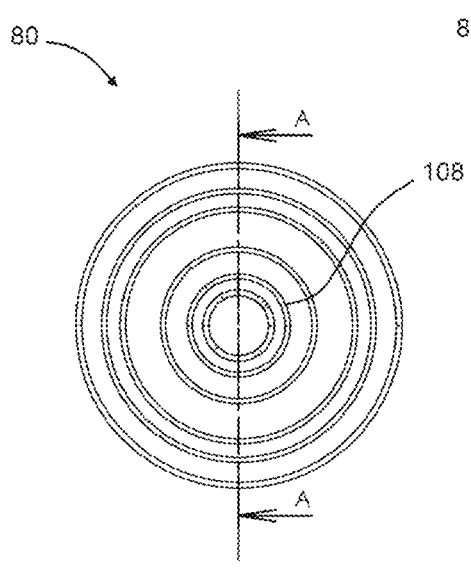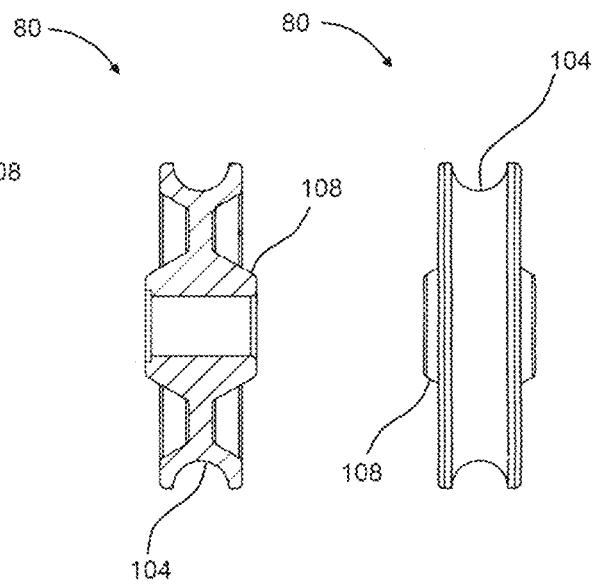
FIG. 7A  FIG. 7B  FIG. 7C

PHONOGRAPH PLAYING VEHICLE

This application claims the benefit of the priority filing date of provisional application No. 62/430,918, filed Dec. 6, 2016, which is incorporated herein in its entirety.

BACKGROUND

The present apparatus relates generally to record players. More specifically, the present apparatus relates to record players that travel around a stationary phonograph.

Lebensfield (U.S. Pat. No. 4,498,164) discloses a player for a stationary phonograph record. Lebensfield anchors to the center hole of a phonograph record. A movable armature bearing a needle cartridge rotates around the phonograph record for playing sound. Lebensfield cannot travel in circles around a record independent of a central anchorage. Because Lebensfield has no way of compensating with the centrifugal force caused by rotational movement, a portion of the device must always remain bound to the center of the record being played.

Mori (U.S. Pat. No. 4,232,202) discloses a vehicular player for a stationary phonograph record with no need for central anchorage. Mori travels in a circle around a phonograph disc without anchorage other than a stylus, but lacks the ability to sense the beginning and ending of the phonograph record, and reduce the speed of the player accordingly. To change the speed of the player to account for the changing circumference of the record groove, Mori uses a variable resistor to change the base voltage supplied to the motor. Since variable resistors are difficult to fine tune, Mori tends to produce warbling when playing a record, and because it cannot sense being placed at the beginning of a record, tends to jump out of the groove and run off the record unless very carefully placed.

Hence, what is needed is a player for a stationary phonograph record having a slow start up, that accurately adheres to a speed equivalent of 33.3 (or similar) revolutions per minute, and that automatically shuts down at the end of the record.

SUMMARY

The disclosed apparatus may be characterized as a phonograph player for playing a phonograph, the phonograph having a groove. The phonograph player includes a body portion which is directly or indirectly coupled to a motor, with the motor configured to drive a drive wheel of the apparatus. The body portion is also coupled to a head-shell. The head-shell is rotatable relative to the body portion and is configured to hold a needle cartridge, thereby allowing the needle cartridge to rotate relative to the body portion. The head-shell is also configured to activate a variable sensor, wherein the variable sensor is configured to govern the speed of the motor to maintain a constant RPM of the apparatus as it travels around the phonograph in the groove. The variable sensor is calibrated such that rotation of the head-shell results in altering the speed of the motor, and is further calibrated such that rotation of the head-shell as the needle cartridge follows the groove on the phonograph results in the drive wheel maintaining the body portion at a constant RPM relative to the phonograph.

In various alternative embodiments, the variable sensor may be a light sensor, and the apparatus may also include a head-shell clip including a slanted block configured to obscure the sensor as the head-shell clip rotates. Facilitating that action, the body portion may include a slot, wherein the head-shell clip includes a tab disposed in the slot, thus limiting rotation of the head-shell clip relative to the body portion. A controller may be provided in communication with the variable sensor and the motor, and the controller is preferably configured to delay activation of the motor when the phonograph player is placed on the phonograph. The head-shell may be rotatable to an off position corresponding to the needle cartridge in a raised position. In additional embodiments, the apparatus may include a speaker, volume control, and a housing at least partially cover the body portion.

In another embodiment, the apparatus may be characterized as a phonograph player for playing a phonograph having a groove, the player including a body portion having a battery, a motor and a drive wheel, a head-shell clip directly or indirectly coupled to the body portion, with the head-shell clip rotatable relative to the body portion and configured to hold a head-shell, thereby allowing the head-shell to rotate relative to the body portion. A light emitter and a sensor are preferably located on opposing sides of a light slot, and the head-shell clip includes an angled block for gradually obscuring the light slot. The sensor is calibrated such that rotation of the head-shell clip results in altering the speed of the motor, and is further calibrated such that rotation of the head-shell clip as the needle cartridge follows the groove on the phonograph results in the drive wheel maintaining the body portion at a constant RPM relative to the phonograph.

In this embodiment, the apparatus may include a spindle port for accommodating the head-shell clip, a coaster wheel, and importantly, the head-shell preferably pulls the needle cartridge in a trailing orientation configuration relative to the phonograph (i.e., opposite a conventional record player, wherein the needle cartridge pushes the needle along the groove). The light block may comprise an angled profile, such that as the head-shell clip rotates, the light block gradually alters the amount of light from the light emitter reaching the sensor. The apparatus may also include a head-shell guide on the head-shell clip for orienting a head-shell in the head-shell clip, and a head-shell wheel guide for maintaining a head-shell wheel between the head-shell clip and the head-shell.

In yet another embodiment, the apparatus may be characterized as a phonograph player for playing a phonograph, the phonograph having a groove, the apparatus including a body portion having a battery, a motor and a drive wheel. A head-shell clip is preferably coupled to the body portion, and may be rotatable relative to the body portion and configured to hold a head-shell, thereby allowing the head-shell to rotate relative to the body portion. A light emitter and a sensor located on opposing sides of a light slot, with the head-shell clip having an angled block for gradually obscuring the light slot. A head shell wheel may be anchored between a head-shell guide and a head-shell wheel guide, with the head-shell held firm and configured to move with the head-shell clip as it rotates. The sensor is preferably calibrated such that rotation of the head-shell clip results in altering the speed of the motor and the drive wheel, and the sensor is further calibrated such that rotation of the head-shell clip as the needle cartridge follows the groove on the phonograph results in the drive wheel maintaining the body portion at a constant RPM relative to the phonograph. Like the other embodiments, the apparatus may include a speaker, a volume control, and a housing.

BRIEF DESCRIPTION OF THE FIGURES

FIG. 2A illustrates a top plan view of a body of the vehicle;

FIG. 2B illustrates a bottom plan view of the body of the vehicle;

FIG. 2C illustrates a section view of the body of the vehicle;

FIG. 2D illustrates a right side elevation view of the body of the vehicle;

FIG. 2E illustrates a left side elevation view of the body of the vehicle;

FIG. 2F illustrates a front elevation view of the body of the vehicle;

FIG. 2G illustrates a rear elevation view of the body of the vehicle;

FIG. 6A illustrates a side elevation view of a drive wheel of the vehicle;

FIG. 6B illustrates a front elevation view of the drive wheel of the vehicle;

FIG. 6C illustrates a cut-away elevation view of the drive wheel of the vehicle;

FIG. 7A illustrates a side elevation view of a cartridge wheel of the vehicle;

FIG. 7B illustrates a front elevation view of the cartridge wheel of the vehicle;

FIG. 7C illustrates a cut-away elevation view of the cartridge wheel of the vehicle;

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
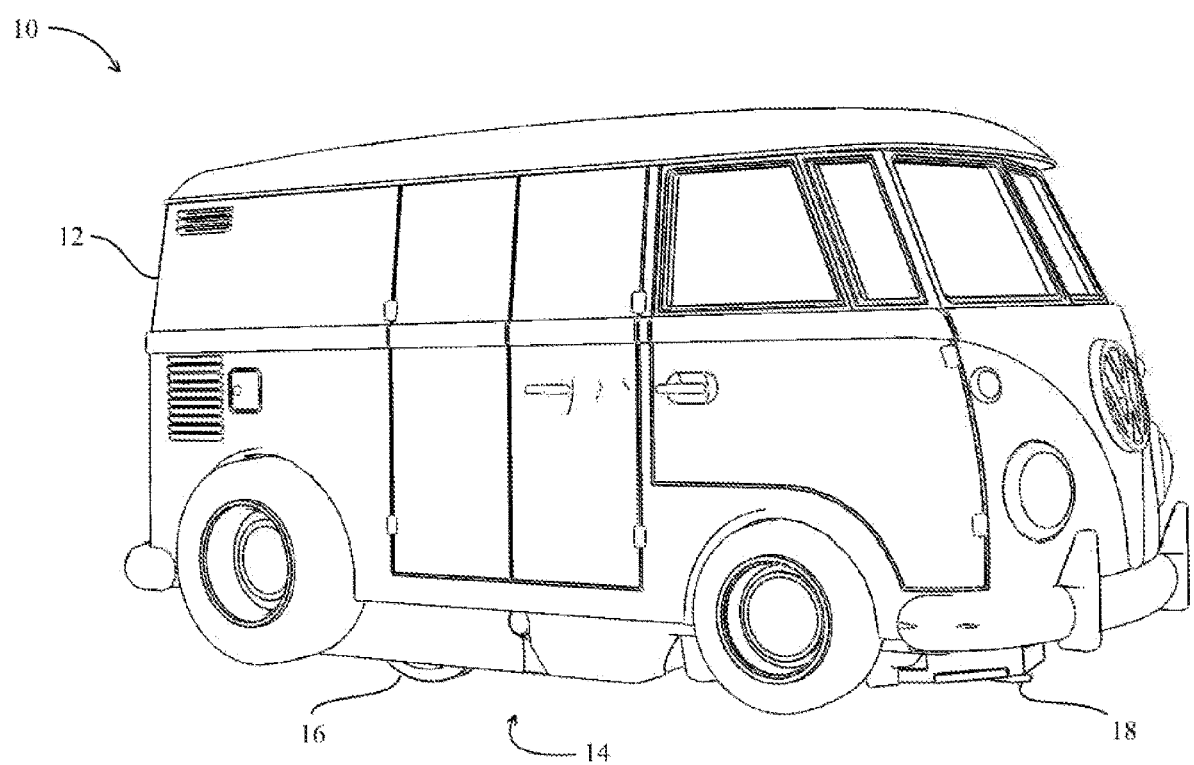
FIG. 1 illustrates a perspective view of a phonograph record playing vehicle.

Referring to FIG. 1, a phonograph playing vehicle (vehicle) 10 is disclosed. The principle components of the vehicle 10 include a housing 12, which is a miniature representative of a conventional automobile or similar vehicle. The housing 12 is primarily a shell that mounts over and covers a vehicle 10 body 14 that holds operational components of the vehicle 10. In the illustrated view, two main operational components are shown; a drive wheel 16 used to urge the vehicle 10 forward atop a phonograph (not shown) and a needle cartridge 18 that tracks the groove (not shown) on the phonograph in the manner of a conventional record player. When the vehicle 10 is placed on the phonograph and activated, the drive wheel 16 drives the vehicle 10 forward at the appropriate speed (i.e., 33.3 rpm) and the needle cartridge 18 follows the groove as the vehicle 10 plays sound recordings contained in the phonograph.

Referring to FIGS. 2A through 2G, the body 14 is shown in orthogonal and section views. FIG. 2A is a bottom plan view of the body 14. To provide room for the drive wheel 16 and a coaster wheel 20 (not shown), the body 14 includes a drive wheel port 22 and a coaster wheel port 24. Between the drive wheel port 22 and coaster wheel port 24, a first battery holder 26 and a second battery holder 28 are placed longitudinally to accommodate, in one preferred embodiment, conventional AAA sized batteries (not shown). The first battery holder 26 and the second battery holder 28 are preferably open on the bottom side of the body 14 for ease of access when removing and replacing the batteries, and to lighten the weight of the body 14 when installed. To the rear of the body 14, an ON/OFF selector port 30 allows a master power switch 32 (not shown) for activating the vehicle 10 to extend through the body 14. The master power switch 32 includes a high power and a low power position, in addition to the off position, to compensate for the motor overheating and slowing down over a long play period.

Toward the front of the body 14, a first slot 34 and a complimentary second slot 36 are formed as an elongated arcs to accommodate movement of the needle cartridge 18 (not shown), allowing the needle cartridge 18 angle in relation to the drive wheel 16 (not shown) to change as the phonograph groove becomes progressively smaller in circumference. Near the first slot 34 and second slot 36, a volume control port 38 allows a volume control 40 (FIG. 9) to pass through for adjusting the volume. Also near the first slot 34 is a power indicator port 42 for holding a power indicator 44 (FIG. 9) that indicates when power is on. The power indicator 44 also serves as a running light to illuminate a record. To maintain the housing 12 (not shown) securely on the body 14, one or more front tabs 46 and a rear tab 48 extend from the body 14 to engage complimentary portions of the housing 12 interior.

Figure 3B:
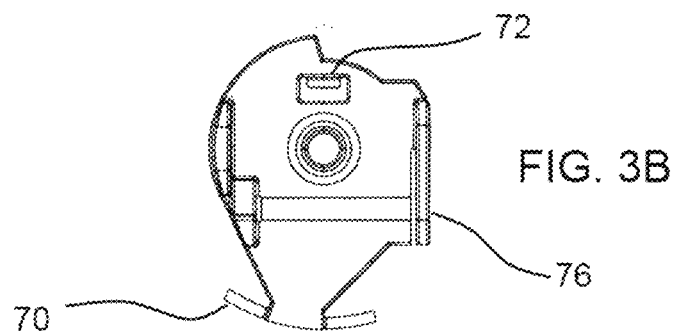
FIG. 3B illustrates a top view of the head-shell clip of the vehicle.
Figure 3C:
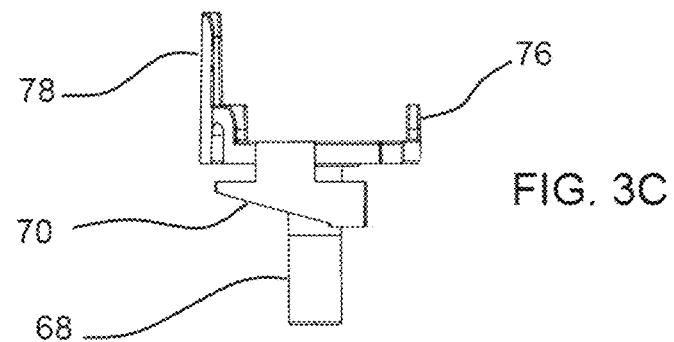
FIG. 3C illustrates a front view of the head-shell clip of the vehicle.
Figures 3A, 3D, 3E:
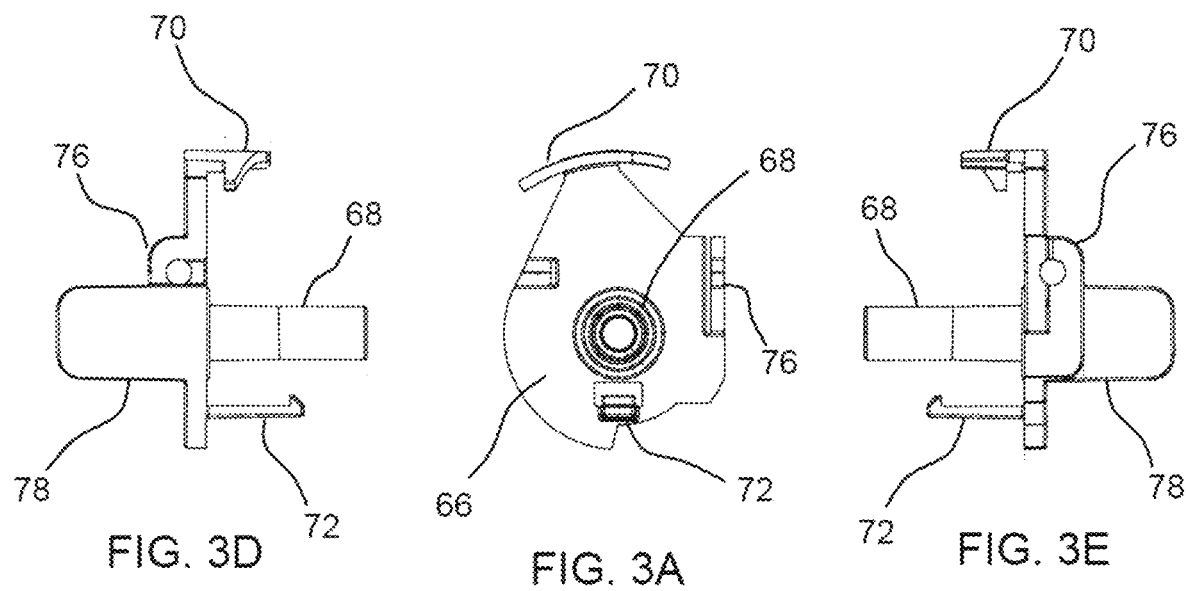
FIG. 3A illustrates a bottom view of a head-shell clip of the vehicle.
FIG. 3D illustrates a left side view of the head-shell clip of the vehicle.
FIG. 3E illustrates a right side view of the head-shell clip of the vehicle.
Figure 4E:
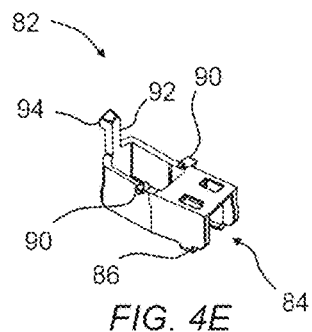
FIG. 4E illustrates a bottom perspective view of the head-shell of the vehicle.
Figure 4F:
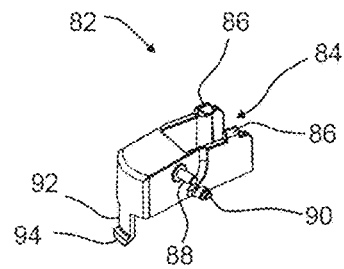
FIG. 4F illustrates a top perspective view of the head-shell of the vehicle.
Figure 4C:
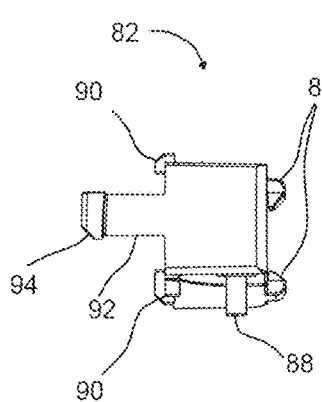
FIG. 4C illustrates a front elevation view of the head-shell of the vehicle.
Figure 4A:
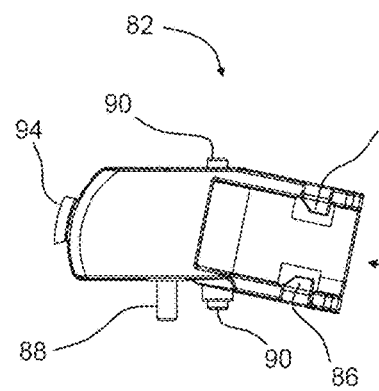
FIG. 4A illustrates a top plan view of a head-shell of the vehicle.
Figure 4D:
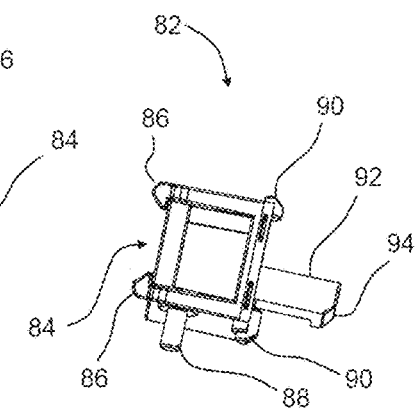
FIG. 4D illustrates a rear elevation view of the head-shell of the vehicle.
Figure 4B:
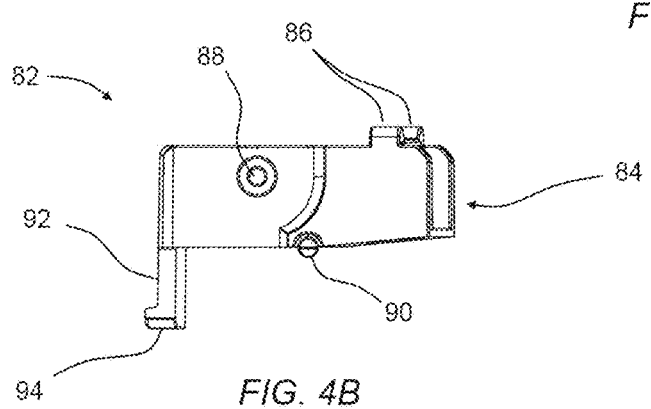
FIG. 4B illustrates a left elevation view of the head-shell of the vehicle.
Figure 5C:
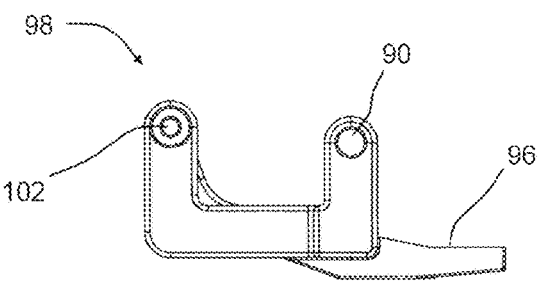
FIG. 5C illustrates a left side elevation view of the chassis of the vehicle.
Figure 5D:
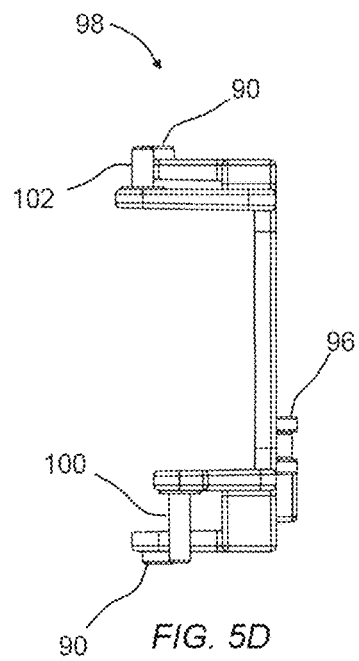
FIG. 5D illustrates a rear elevation view of the chassis of the vehicle.
Figure 5A:
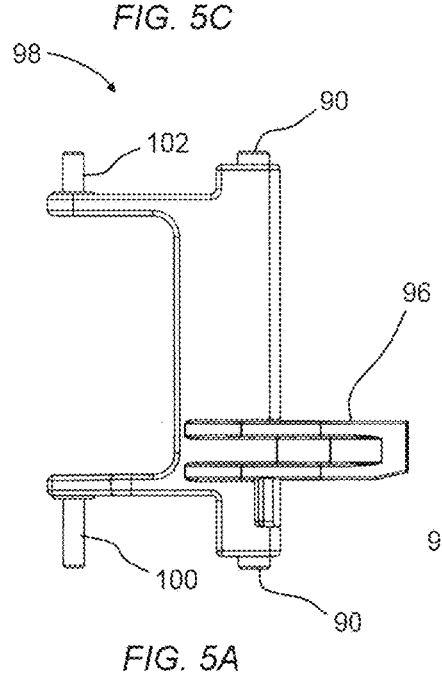
FIG. 5A illustrates a top plan view of a chassis of the vehicle.
Figure 5E:
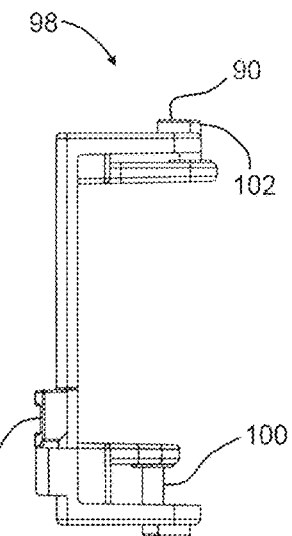
FIG. 5E illustrates a front elevation view of the chassis of the vehicle.
Figure 5B:
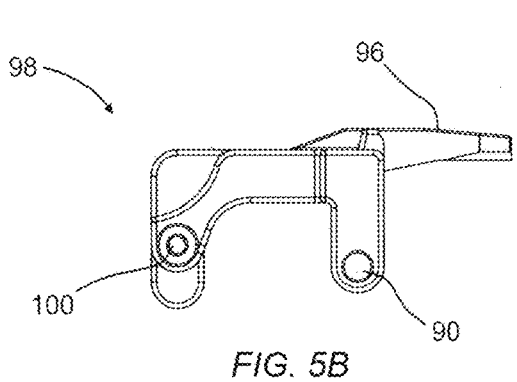
FIG. 5B illustrates a right side elevation view of the chassis of the vehicle.
Figure 5F:
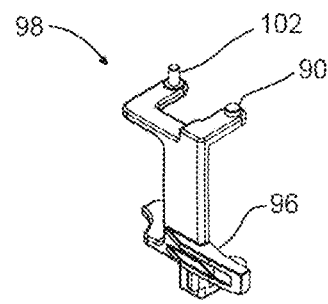
FIG. 5F illustrates a perspective view of the chassis of the vehicle.
Figure 8B:
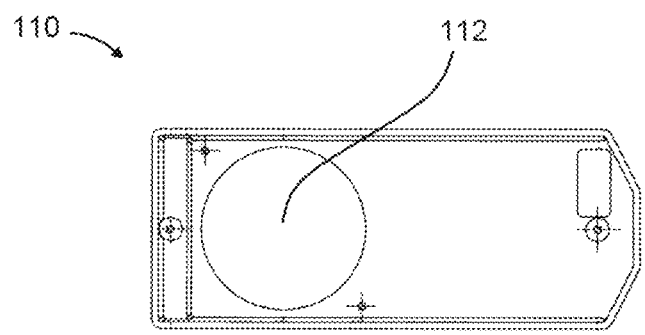
FIG. 8B illustrates a bottom plan view of the body cover of the vehicle.
Figure 8D:
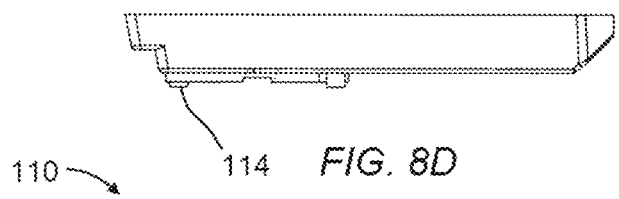
FIG. 8D illustrates a left side elevation view of the body cover of the vehicle.
Figure 8C:
FIG. 8C illustrates a cut-away elevation view of the body cover of the vehicle.
Figures 8A, 8F, 8G:
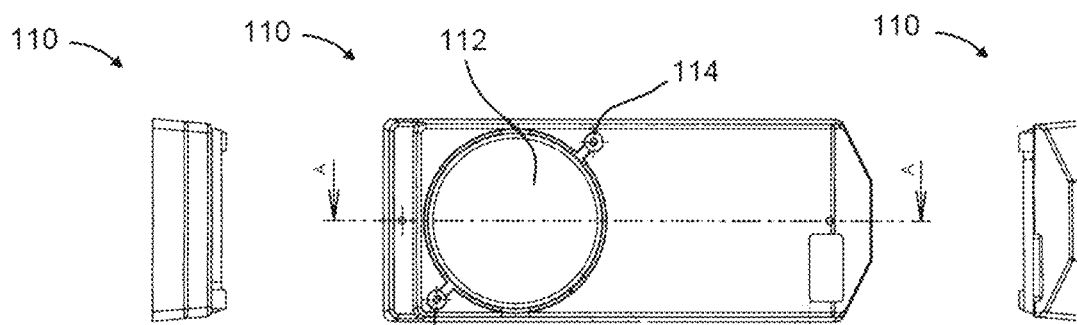
FIG. 8A illustrates a top plan view of a body cover of the vehicle.
FIG. 8F illustrates a rear elevation view of the body cover of the vehicle.
FIG. 8G illustrates a front elevation view of the body cover of the vehicle.
Figure 8E:
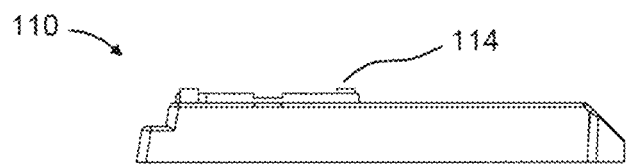
FIG. 8E illustrates a right side elevation view of the body cover of the vehicle.

FIG. 2B shows a top plan view of the body 14. In this view, a motor housing 50 is shown for securing a motor 52 (FIG. 9) coupled to the drive wheel 16 for urging the vehicle 10 forward. Adjacent the first slot 34, a light holder 54 for holding a light emitter 56 (FIG. 9), and a sensor holder 58 for holding a sensor 60 (FIG. 9) are located at either end of a light slot 62. A spindle port 64 for accommodating a rotating head-shell clip 66 (FIG. 3) is located between the first slot 34 and the second slot 36. FIG. 2C shows a section view of the body 14 looking rearward. FIGS. 2D, 2E, 2F and 2G, respectively, show right side, left side, front and back views of the body 14.

Figure 9:
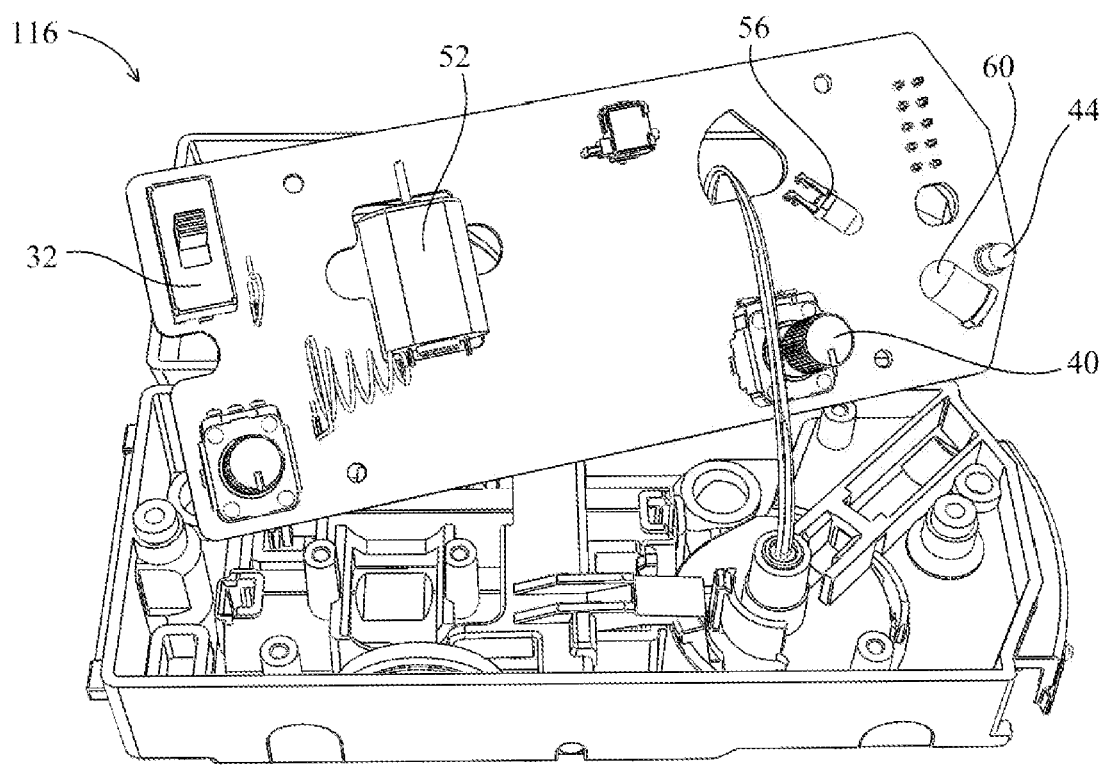
FIG. 9 illustrates a circuit board of the vehicle.

Referring to FIGS. 3A through 3E, head-shell clip 66 engages the body 14 in a rotating arrangement, allowing the needle cartridge 18 to change its angle relative to the body 14. The head-shell clip 66 includes a spindle 68 that inserts into the spindle port 64. On the same side of the head-shell clip 66 as the spindle 68, a light block 70 is arced for insertion into the first slot 34. The light block 70 has an angled profile, so that when the head-shell clip 66 rotates, the light block 70 gradually changes the amount of light from the light emitter 56 (FIG. 9) reaching the sensor 60 (FIG. 9). Also on the same side of the head-shell clip 66 as the light block 70, a guide member 72 is positioned for insertion into the second slot 36. The guide member 72 rotates in tandem with the light block 70 and helps to ensure the head-shell clip 66 maintains its alignment with the body 14, thereby ensuring the light block 70 operates reliably over repeated uses as it governs the amount of light reaching the sensor 60.

On the side of the head-shell clip 66 opposite the light block 70 and guide member 72, the head-shell clip 66 includes a head-shell guide 76 for orienting a head-shell 78 in the head-shell clip 66, and a head-shell wheel guide 78 for maintaining a head-shell wheel 80 (FIG. 7) between the head-shell clip 66 and a head-shell 82 (FIG. 4). With the head-shell 82 and headshell wheel 80 anchored between the head-shell guide 76 and head-shell wheel guide 78, the head-shell 82 is held firm and moves with the head-shell clip 66 as it freely rotates, guided by the phonograph groove (not shown), with the light block 70 moving in the first slot 34 changing the amount of light from the light emitter 56 reaching the sensor 60, and the guide member 72 preserving the head-shell clip 66 in position relative to the body 14.

Referring to FIGS. 4A through 4F, the head-shell 82 is shown. The head-shell 82 holds the needle cartridge 18, supports the head-shell wheel 80 (FIG. 7), and moves relative to the body 14 to accommodate for the changing circumference of the phonograph groove (not shown). The head-shell 82 includes a dock 84 having dock clips 86 for holding the needle cartridge 18 tightly in place in the dock 84. A head-shell wheel axle 88 extends from the head-shell 82 for supporting the head-shell wheel 80 (FIG. 7) and engaging the head-shell wheel guide 78 on the head-shell clip 66. A pair of posts 90 on either side of the head-shell 82 engage the head-shell guide 76 and the head-shell wheel guide 78, further anchoring the needle cartridge 18 in the dock 84.

A stop member 92 extending from the head-shell 82 extends through the second slot 36 on the body 14 (along with the guide member 72) and terminates in a slanted stop 94. The slanted stop 94 engages an armature 96 (FIG. 5) extending from a chassis 98 (FIG. 5) in a pressure fit, such that when the stop member 92 engages the armature 96, the needle cartridge 18 is held in place in an 'off' position, thereby preventing the head-shell clip 66 from rotating freely as the vehicle 10 is turned over and from side to side. A slight pressure against the needle cartridge 18 releases the head-shell 82, allowing it to rotate freely when travelling along the phonograph groove (not shown). Preferably the needle cartridge 18 is removable from the head-shell 82 in the manner of a conventional head-shell, and can easily be unplugged and replaced. Also, the needle cartridge 18 may be oriented so that the stylus (not shown) may be pulled or pushed by the needle cartridge 18 (i.e., the metal strip leading to the stylus tip is angled forward or rearward).

Referring to FIGS. 5A through 5F, the chassis 98 supports the drive wheel 16, coaster wheel 20 (not shown), and rocks back and forth on posts 90, thereby allowing the armature 96 to raise and lower relative to the stop member 92. The chassis 98 also includes a drive wheel axle 100 and a coaster wheel axle 102 that raise and lower the drive wheel 16 and the coaster wheel 20 as the chassis 98 rocks back and forth. The purpose of the rocking movement is that when the needle cartridge 18 is moved out from under the armature 96 and the vehicle 10 placed on a phonograph (not shown), the drive wheel 16 and the coaster wheel 20 tilt the chassis 98, causing the armature 96 to lower. In the lowered position, the armature blocks the stop member, thereby maintaining the needle cartridge 18 at the proper angle for playing the outer edge of the phonograph.

Referring to FIGS. 6A through 6C, the drive wheel 16 is shown. The drive wheel includes a channel for accommodating a rubberized or similarly textured ring (not shown) for gripping the motor 52 in the body 14 and for maintaining a non-slip, vibration dampening grip on the phonograph (not shown). The drive wheel 16 also has an offset hub sized so that the hub contacts the housing 12, and maintains the drive wheel 16 on the drive wheel axle 100 of the chassis 98.

Referring to FIGS. 7A-7C, the head-shell wheel 80 is shown. The head-shell wheel 80 also includes a channel for accommodating a rubberized or similarly textured ring (not shown) for maintaining a non-slip, vibration dampening grip on the phonograph (not shown). The head-shell wheel 80 serves the dual purposes of acting as a third support, necessary to avoid the body 14 from touching a surface on which the vehicle 10 rests, as well as helping ensure the needle cartridge 18 preserves the needle (not shown) in the phonograph groove without skipping.

Referring to FIGS. 8A-8G, the speaker mount 110 is shown. The speaker mount 110 is a concave structure having a speaker opening 112, thereby providing a sounding board function to enhance sound quality. A speaker (not shown) is mounted over the speaker opening 112 using a mounting ring 114. The speaker mount 110 is preferably complimentary to the body 14 and the circuit board 116 (FIG. 8) so that when the speaker mount 110 is attached to the body 14 and circuit board 116, a single unitary structure is formed. The circuit board 116 is low in profile, allowing the speaker mount 110 to be made with a reduced profile (i.e., closer to the circuit board 116), thereby leaving more space above the body 14 for accommodating different vehicle designs.

Referring to FIG. 9, the circuit board 116 is shown. As discussed, the circuit board 116 preferably has a peripheral contour complimentary with the body 14 and speaker mount 110. Mounted on the circuit board 116 in addition to operational components in general, are the master power switch 32 and volume control 40 that extend through the rear of the body 14 for access by a user. Also mounted on the circuit board are the power indicator 44, which also extends through the power indicator port 42 for viewing by a user, the motor 52 that engages the drive wheel 16, and the light emitter 56 and sensor 60.

The structure of the phonograph playing vehicle having been shown and described, its method of operation will now be discussed.

In order to operate the vehicle 10, a user first installs batteries in the first battery holder 26 and second battery holder 28, and urges the needle cartridge 18 from a 'parked' position (i.e., with the stop member 92 held under the armature 96) to rotate freely under the body 14. Before or after moving the needle cartridge 18, the user activates the master power switch 32. The master power switch 32 may incorporate a switch delay, allowing time to set the vehicle 10 down onto a phonograph, or may have a setting allowing the vehicle 10 to detect being set down and move only when placed on the phonograph. Preferably, when the needle cartridge 18 is placed in the stowed and locked position, the motor disengages from the drive wheel 16.

When the vehicle 10 is placed on the phonograph, it begins to roll around the phonograph with the needle in the phonograph groove. To avoid damage to the phonograph by overweighting the needle, the head-shell wheel 80 supports the vehicle, and the weight of the needle cartridge 18 preserves the needle in the groove, similar to a conventional record player. The needle is held in place in the groove by the weight of the needle cartridge 18. Preferably, the vehicle 10 begins at a slow speed, including a five second slow start-up that builds up to regular speed, to avoid running off the record in an uncontrolled manner. The vehicle 10 also senses being lifted off the phonograph and stops the motor 52. Ordinarily, the vehicle 10 will be allowed to play the entire side of the phonograph.

As the vehicle travels around the phonograph, it follows the groove in concentric circles of gradually reducing diameter. Over the course of this process, the vehicle must change velocity to preserve the equivalent of 33.3 (or similar) revolutions per minute. As the vehicle 10 makes its way toward the center of the phonograph the angle of the needle cartridge 18 must change as well. To accomplish these two goals, the head-shell clip 66 begins at an angle approaching the lock position of the needle cartridge 18. At that angle, the light block 70 is at a position between the light emitter 56 and sensor 60 calibrated so that the circuit board causes the motor 52 to spin the drive wheel 16 at a rate that drives the vehicle 10 at a speed equivalent to 33.3 revolutions per minute (after the initial slow start up). In a preferred embodiment, the vehicle 10 remains at 1.8 seconds per revolution while it is playing after initial startup.

As the vehicle 10 makes its way toward the center of the phonograph, the angle of the needle cartridge 18 slowly moves inward, causing the head-shell 82 and head-shell clip 66 to move in tandem. As the head-shell clip 66 rotates, the light block 70 moves through the first slot 34, and by virtue of its slanted height, gradually changes the amount of light from the light emitter 56 reaching the sensor 60. This gradual change in the amount of light reaching the sensor 60 is calibrated to change the speed of the motor 52, and thus the speed of the vehicle 10, so that the equivalent of 33.3 revolutions per minute is preserved.

When the needle cartridge 18 reaches the end of the groove, it is at an extreme angle relative to the orientation of the vehicle 10. At that angle the light block 70 reaches its greatest level of obscuring the light reaching the sensor, causing the vehicle 10 to come to a stop, even though the vehicle 10 is still on and drawing power. When the needle cartridge 18 reaches the angle for stopping, the vehicle 10 may cycle the five second start up delay for the next time the vehicle 10 begins to play a phonograph.

The user may then lift the vehicle 10 off the phonograph, urge the needle cartridge 18 to its locked position, and switch the power off. The power indicator 44 provides an easy to see visual cue that the vehicle 10 is switched off. The vehicle 10 may then be stored for later use as desired.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A phonograph player for playing a phonograph having a groove, the player comprising:
    a body portion coupled to a motor, the motor configured to drive a drive wheel;
    the body portion further coupled to a head-shell;
    the head-shell rotatable relative to the body portion and configured to hold a needle cartridge, thereby allowing the needle cartridge to rotate relative to the body portion;
    the head-shell configured to activate a variable sensor, the variable sensor configured to govern a speed of the motor;
    the variable sensor calibrated such that rotation of the head-shell results in altering the speed of the motor; and
    wherein the sensor is further calibrated such that rotation of the head-shell as the needle cartridge follows the groove on the phonograph results in the drive wheel maintaining the body portion at a constant RPM relative to the phonograph.

2. The phonograph player of claim 1 wherein the variable sensor is a light sensor.

3. The phonograph player of claim 1 further comprising a head-shell clip comprising a slanted block configured to obscure the sensor as the head-shell clip rotates.

4. The phonograph player of claim 3 wherein the body portion comprises a slot, and the head-shell clip comprises a tab disposed in the slot, limiting rotation of the head-shell clip relative to the body portion.

5. The phonograph player of claim 1 further comprising a controller in communication with the variable sensor and the motor.

6. The phonograph player of claim 5 wherein the controller is configured to delay activation of the motor when the phonograph player is placed on the phonograph.

7. The phonograph player of claim 1 wherein the head-shell is rotatable to an off position corresponding to the needle cartridge in a raised position.

8. The phonograph player of claim 1 further comprising a speaker.

9. The phonograph player of claim 1 further comprising a volume control.

10. The phonograph player of claim 1 further comprising a housing, the housing configured to at least partially cover the body portion.

11. A phonograph player for playing a phonograph having a groove, the player comprising:

a body portion having a battery, a motor and a drive wheel;

a head-shell clip coupled to the body portion, the head-shell clip rotatable relative to the body portion and configured to hold a head-shell, thereby allowing the head-shell to rotate relative to the body portion;

a light emitter and a sensor located on opposing sides of a light slot;

the head-shell clip having an angled block for gradually obscuring the light slot;

the sensor calibrated such that rotation of the head-shell clip results in altering the speed of the motor; and wherein the sensor is further calibrated such that rotation of the head-shell clip as the phonograph player follows the groove on the phonograph results in the drive wheel maintaining the body portion at a constant RPM relative to the phonograph.

12. The phonograph player of claim 11 further comprising a spindle port for accommodating the head-shell clip.

13. The phonograph player of claim 11 further comprising a coaster wheel.

14. The phonograph player of claim 11 wherein the head-shell pulls a needle cartridge in a trailing configuration relative to the phonograph.

15. The phonograph player of claim 11 wherein the angled block comprises an angled profile, such that as the head-shell clip rotates, the angled block gradually alters the amount of light from the light emitter reaching the sensor.

16. The phonograph player of claim 11 further comprising a head-shell guide on the head-shell clip for orienting a head-shell in the head-shell clip.

17. The phonograph player of claim 16, further comprising a head-shell wheel guide for maintaining a head-shell wheel between the head-shell clip and the head-shell.

18. A phonograph player for playing a phonograph having a groove, the player comprising:

a body portion having a battery, a motor and a drive wheel;

a head-shell clip coupled to the body portion, the head-shell clip rotatable relative to the body portion and configured to hold a head-shell, thereby allowing the head-shell to rotate relative to the body portion;

a light emitter and a sensor located on opposing sides of a light slot;

the head-shell clip having an angled block for gradually obscuring the light slot;

a head shell wheel anchored between a head-shell guide and a head-shell wheel guide, the head-shell held firm and configured to move with the head-shell clip as it rotates;

the sensor calibrated such that rotation of the head-shell clip results in altering the speed of the motor; and wherein the sensor is further calibrated such that rotation of the head-shell clip as the phonograph player follows the groove on the phonograph results in the drive wheel maintaining the body portion at a constant RPM relative to the phonograph.

19. The phonograph player of claim 18 further comprising a speaker and a volume control.

20. The phonograph player of claim 18 further comprising a housing.

* * * * *